(12) United States Patent
Lee et al.

(10) Patent No.: US 12,164,337 B2
(45) Date of Patent: Dec. 10, 2024

(54) DISPLAY DEVICE

(71) Applicant: Samsung Display Co., LTD., Gyeonggi-do (KR)

(72) Inventors: Sang Jun Lee, Gyeonggi-do (KR); Jin Hwan Choi, Seoul (KR); Beom Jin Kim, Chungcheongnam-do (KR); Tae Woong Kim, Gyeonggi-do (KR); Jae Ho Ahn, Chungcheongnam-do (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 192 days.

(21) Appl. No.: 17/865,972

(22) Filed: Jul. 15, 2022

(65) Prior Publication Data

US 2023/0161380 A1 May 25, 2023

(30) Foreign Application Priority Data

Nov. 25, 2021 (KR) .......................... 10-2021-0164667

(51) Int. Cl.
*G06F 1/16* (2006.01)
*H04M 1/02* (2006.01)

(52) U.S. Cl.
CPC ........ *G06F 1/1652* (2013.01); *H04M 1/0268* (2013.01)

(58) Field of Classification Search
CPC ........................... G06F 1/1652; H04M 1/0268
See application file for complete search history.

(56) References Cited

U.S. PATENT DOCUMENTS

| 6,762,929 | B2 * | 7/2004 | Sawyer | H04M 1/0268 345/905 |
| 9,098,241 | B1 * | 8/2015 | Cho | B65H 75/28 |
| 2007/0241002 | A1 * | 10/2007 | Wu | G06F 1/1601 206/150 |
| 2015/0029229 | A1 * | 1/2015 | Voutsas | G06F 1/1647 345/1.3 |
| 2017/0359911 | A1 * | 12/2017 | Hayk | G09F 9/301 |
| 2018/0014417 | A1 * | 1/2018 | Seo | H05K 1/189 |
| 2018/0102072 | A1 * | 4/2018 | Lee | G06F 1/1652 |

FOREIGN PATENT DOCUMENTS

| CN | 109587299 A | * | 4/2019 |
| CN | 212659253 U | | 3/2021 |
| KR | 20170136060 A | | 12/2017 |
| KR | 20170139733 A | | 12/2017 |
| KR | 20170143112 A | | 12/2017 |
| KR | 20180006533 A | | 1/2018 |

* cited by examiner

*Primary Examiner* — Nidhi Thaker
(74) *Attorney, Agent, or Firm* — CANTOR COLBURN LLP (57) ABSTRACT

A display device includes a display panel including a first surface which displays images and a second surface opposite to the first surface, a supporter disposed on the second surface of the display panel, a roller to which a first end of the display panel and a first end of the supporter are connected and on which the display panel and the supporter are wound, a first case to which a second end of the display panel opposite to the first end of the display panel is connected, a second case which is disposed on the first case and to which an end of the roller is connected, and an elasticity member connected between the first case and the second case, where the second case and the first case at least partly overlap each other and slide.

18 Claims, 13 Drawing Sheets

DISPLAY DEVICE

This application claims priority to Korean Patent Application No. 10-2021-0164667, filed on Nov. 25, 2021, and all the benefits accruing therefrom under 35 U.S.C. § 119, the content of which in its entirety is herein incorporated by reference.

BACKGROUND

(a) Field

Embodiments of the invention relate to a display device, and particularly relate to a rollable display device.

(b) Description of the Related Art

Together with a recent development of display-related technology, deformable display devices, such as foldable, rollable in a roll shape, or stretchable like a rubber band during use are being researched and developed. As the display device is modifiable in various shapes, a request of enlarging the display device in the use stage and a request of down-sizing the display for the purpose of portability may be satisfied.

The display device that may be transformed such as a rollable display device includes a supporter for supporting a display panel when the display panel is unfolded.

SUMMARY

Embodiments of the invention have been made in an effort to reduce a thickness of a rollable display device and improve surface quality of a display panel when the display panel is unwound and wound.

An embodiment of the invention provides a display device including a display panel including a first surface which displays images and a second surface opposite to the first surface, a supporter disposed on the second surface of the display panel, a roller to which a first end of the display panel and a first end of the supporter are connected and on which the display panel and the supporter are wound, a first case to which a second end of the display panel opposite to the first end of the display panel is connected, a second case which is disposed on the first case and to which an end of the roller is connected, and an elasticity member connected between the first case and the second case, where the second case and the first case at least partly overlap each other and slide.

In an embodiment, the first case may slide in a first direction with respect to the second case, and the elasticity member may extend in the first direction.

In an embodiment, the supporter may have a form bent upward or downward while the display panel and the supporter are unfolded from the roller in an unwinding state, and the supporter may be unfolded and may be wound on the roller while the display panel and the supporter are wound on the roller in a winding state.

In an embodiment, the display panel may be disposed further outside than the supporter while the display panel and the supporter are wound on the roller.

In an embodiment, the elasticity member may include an extension spring, and while the display panel and the supporter are unfolded from the roller in an unwinding state and are wound on the roller in a winding state, the extension spring may be extended.

In an embodiment, a length of the extension spring when the display panel and the supporter are wound may be greater than a length of the extension spring when the same are unwound.

In an embodiment, corresponding edges of the first case and the second case may be arranged while the display panel and the supporter are completely wound on the roller, and corresponding edges of the first case and the second case may be spaced apart from each other in the first direction while the display panel and the supporter are unfolded from the roller which is an unwinding state.

In an embodiment, the first case may further include a protrusion protruding from a side of the first case facing the second case, and a first end of the elasticity member may be connected to a lateral side of the protrusion and may be fixed thereto.

In an embodiment, the protrusion may be disposed near an edge connected to the display panel from among edges of the first case.

In an embodiment, a groove may be defined in the second case in a position corresponding to the protrusion, the elasticity member may be disposed in the groove, and the groove may extend in the first direction.

In an embodiment, the groove may include an end portion spaced apart from an opposite edge to the edge to which the supporter is connected from among edges of the second case, and a second end of the elasticity member may be connected to a lateral side of the end portion of the groove.

In an embodiment, at least one of the first case, the second case, and the roller may include a space therein.

In an embodiment, the display device may further include at least one of a battery and a circuit board disposed in an internal space.

In an embodiment, the display device may further include a guide rail disposed on a side of the second case facing the first case, where the guide rail may extend in a direction in which the first case slides with respect to the lower case.

In an embodiment, the display device may further include a fixing member for, when the display panel and the supporter are completely wound on the roller, fixing the first case on the second case.

Another embodiment of the invention provides a display panel including a first surface which displays images and a second surface opposite to the first surface, a supporter disposed on the second surface of the display panel, a roller to which a first end of the display panel and a first end of the supporter are connected and on which the display panel and the supporter are wound, a first case to which a second end of the display panel opposite to the first end of the display panel is connected, a second case which is disposed on the first case and to which an end of the roller is connected, and an elasticity member including a portion disposed between a first side of the first case facing the second case and a first side of the lower case facing the first case.

In an embodiment, the second case and the first case may at least partly overlap each other and slide in a first direction.

In an embodiment, the elasticity member may include an extension spring, and the extension spring may be extended while the display panel and the supporter are unfolded from the roller which is an unwinding state and are wound on the roller which is a winding state.

In an embodiment, a length of the extension spring when the display panel and the supporter are wound may be greater than a length of the extension spring when the display panel and the supporter are unwound.

Yet another embodiment of the invention provides a display panel including a first surface which displaying images and a second surface opposite to the first surface, a supporter disposed on the second surface of the display panel, a roller to which a first end of the display panel and a first end of the supporter are connected and on which the display panel and the supporter are wound, a first case to which a second end of the display panel opposite to the first end of the display panel is connected, a second case which is disposed on the first case and to which an end of the roller is connected, and an elasticity member connected between the first case and the second case, where a groove is defined in the lower case, the elasticity member is disposed in the groove, and the groove and the elasticity member extend in a same direction.

By the embodiments, the thickness of the rollable display device may be reduced, and the surface quality of the display panel may be improved when the display panel is unwound and wound.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Embodiments of the invention will be described more fully hereinafter with reference to the accompanying drawings, in which embodiments of the invention are shown. As those skilled in the art would realize, the described embodiments may be modified in various different ways, all without departing from the spirit or scope of the invention.

Parts that are irrelevant to the description will be omitted to clearly describe the invention, and the same elements will be designated by the same reference numerals throughout the specification.

Parts that are irrelevant to the description are omitted to clearly describe the invention, and like reference numerals designate like elements throughout the specification. The thicknesses of layers, films, panels, regions, etc., are enlarged for clarity. For ease of description, the thicknesses of some layers and areas are exaggerated.

It will be understood that when an element such as a layer, film, region, or substrate is also referred to as being "on" another element, it may be directly on the other element or intervening elements may also be present. In contrast, when an element is also referred to as being "directly on" another element, there are no intervening elements present. The word "on" or "above" means disposed on or below the object portion, and does not necessarily mean disposed on the upper side of the object portion based on a gravitational direction.

Unless explicitly described to the contrary, the word "comprise" and variations such as "comprises" or "comprising" will be understood to imply the inclusion of stated elements but not the exclusion of any other elements.

The phrase "in a plan view" means viewing a target portion from the top, and the phrase "in a cross-sectional view" means viewing a cross-section formed by vertically cutting a target portion from the side.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

A detailed structure of a display device in an embodiment will now be described with reference to FIG. 1 and FIG. 2.

Figure 1:
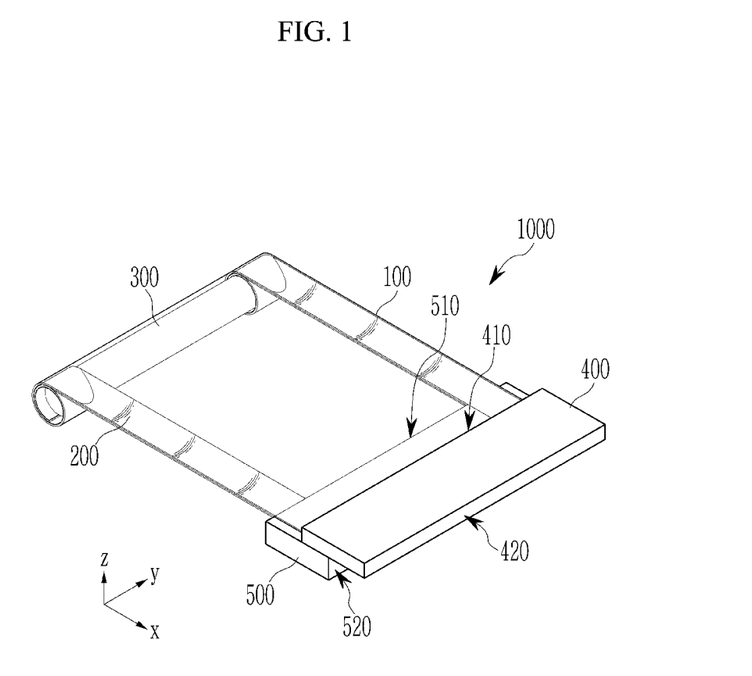
FIG. 1 shows a perspective view of an embodiment of a display device when a display panel and a supporter of a display device are unwound.
Figure 2:
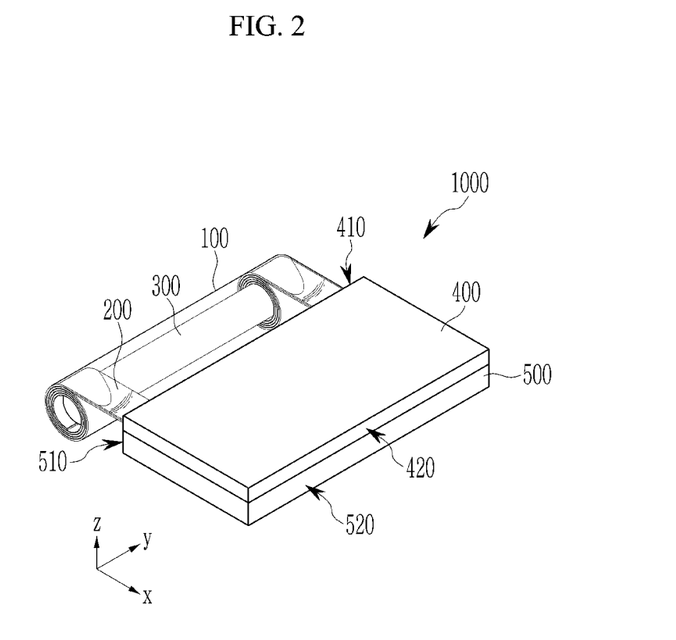
FIG. 2 shows a perspective view of an embodiment of a display device when a display panel and a supporter of a display device are wound.

FIG. 1 shows a perspective view of an embodiment a display device when a display panel and a supporter of a display device are unwound, and FIG. 2 shows a perspective view of an embodiment of a display device when a display panel and a supporter of a display device are wound.

Referring to FIG. 1 and FIG. 2, the display device 1000 includes, as a rollable display device, a display panel 100, at least one supporter 200, a roller 300, an upper case 400, and a lower case 500.

The display panel 100 and the supporter 200 may be flexible, and may be wound and unwound. That is, the display panel 100 and the supporter 200 may be wound on the roller 300 or may be unfolded (or unwound) to an outside from the roller 300. Hereinafter, being wound on the roller 300 will also be also referred to as being rolled up thereon.

The display panel 100 may include a plurality of pixels for displaying images. The display panel 100 may display the images in a z direction that is an upper direction in FIG. 1. That is, the display panel 100 may include a display area going in the z direction and substantially extending in an xy plane.

The supporter 200 may be disposed on a lower portion of the display panel 100 and may support the display panel 100 at the lower portion while the display panel 100 is unfolded.

The supporter 200 may be disposed on the lower portion of the display panel 100 and may include at least two portions spaced apart from each other. The at least two portions of the supporter 200 spaced apart from each other may include two portions disposed on two edges of the display panel 100 facing each other in they direction. The two edges of the display panel 100 facing each other in they direction may extend in the x direction as shown in FIG. 1.

A cross-section of the supporter 200 may have a shape supporting the display panel 100. In an embodiment, the cross-section of the supporter 200 with respect to the yz plane may have a plate shape bent upward or downward, for example. FIG. 1 exemplifies a shape of the supporter 200 bent downward in a convex way, and without being limited thereto, it may have a shape bent upward in a convex way. A cross-section of the supporter 200 in the yz plane may substantially have a U shape but is not limited thereto. According to the cross-sectional shape of the supporter 200, the supporter 200 may have a tension in the x direction.

The supporter 200 bent when the supporter 200 is wound on the roller 300 may maintain an unfolded state and may be wound on the roller 300.

In an embodiment, the supporter 200 may include at least one of glass fiber reinforced plastics ("GFRP"), carbon fiber reinforced plastics ("CFRP"), aluminum, and plastic.

Referring to FIG. 1 and FIG. 2, the display panel 100 and the supporter 200 may be unwound or wound in parallel to the x direction.

As shown in FIG. 2, when the display panel 100 displays an image in the x direction and the display panel 100 is wound, the display panel 100 may be wound on the roller 300 while disposed further outside than the supporter 200 is. That is, the roller 300 may rotate in a counterclockwise direction when the display panel 100 is wound, and the roller 300 may rotate in a clockwise direction when the display panel 100 is unwound. The rotation direction of the roller 300 is not limited thereto.

As shown in FIG. 2, while the display panel 100 is wound, the display area of the display panel 100 may not be exposed to the outside and the display panel 100 may be turned off. On the contrary, as shown in FIG. 1, while the display panel 100 is unwound, the display area of the display panel 100 may extend and may maintain to be flat in the xy plane. Here, the display panel 100 may be maintained to be flat by the supporter 200. While the display panel 100 is unwound, the display panel 100 may be turned on and may display the images.

The roller 300 may be substantially cylindrical, and may have a cylindrical shape extending in the y direction that is perpendicular to the x direction in which the display panel 100 and the supporter 200 are wound or unwound. However, the shape of the roller 300 is not limited thereto. The roller 300 may be driven by a driving device such as a motor. According to a rotation of the roller 300, the display panel 100 and the supporter 200 may be wound and unwound on the circumference of the roller 300.

The display panel 100 and the supporter 200 may be wound on one roller 300. Therefore, the slim display device may be realized by reducing the thickness of the display device, compared to the rollable display device for connecting the display panel 100 and the supporter 200 to respective rollers and winding or unwinding the same.

When the display panel 100 is disposed to the outside, a winding radius of the display panel 100 may be greater than a winding radius of the supporter 200. Hence, when the display panel 10 and the supporter 200 are unfolded from the roller 300 and are unwound, a length of the display panel 100 in the x direction may be greater than a length of the supporter 200 in the x direction.

The supporter 200 and the display panel 100 overlapping each other in the z direction may not be adhered to each other in most of the region, and the supporter 200 and the display panel 100 may be slid to with respect to each other in the x direction when the supporter 200 and the display panel 100 are wound and unwound. Therefore, damage such as peeling off or cracks caused by a length deviation in the x direction when the display panel 100 and the supporter 200 are wound and unwind may be prevented.

The upper case 400 and the lower case 500 overlap each other in the z direction. When the display panel 100 and the supporter 200 are wound and unwound, the upper case 400 and the lower case 500 may at least partly overlap each other, may slide in the x direction, and may be opened as shown in FIG. 1 or mostly overlap each other as shown in FIG. 2.

As shown in FIG. 2, while the display panel 100 and the supporter 200 are wound, edges 410 and 510, and 420 and 520, which correspond to each other, of the upper case 400 and the lower case 500 may be arranged to overlap each other and be stacked. As shown in FIG. 1, the display panel 100 and the supporter 200 are unwound, the upper case 400 further slides in the x direction that is an unwinding direction with respect to the position of the lower case 500, and the edge 410 of the upper case 400 may become distant from the edge 510 of the lower case 500 in the x direction, and the edge 420 of the upper case 400 may become distant from the edge 520 of the lower case in the x direction.

A first end of the display panel 100 may be fixed to the roller 300, and a second end of the display panel 100 opposite to the first end of the display panel 100 in the x direction may be fixed to the edge 410 of the upper case 400. A first end of the supporter 200 may be fixed to the roller 300, and a second end of the supporter 200 opposite to the first end of the supporter 200 in the x direction may be fixed to the edge 510 of the lower case 500.

An upper case 400, a lower case 500, and an elasticity member of a display device in an embodiment will now be described in detail with reference to FIG. 3 to FIG. 6 together with FIG. 1 and FIG. 2.

Figure 3:
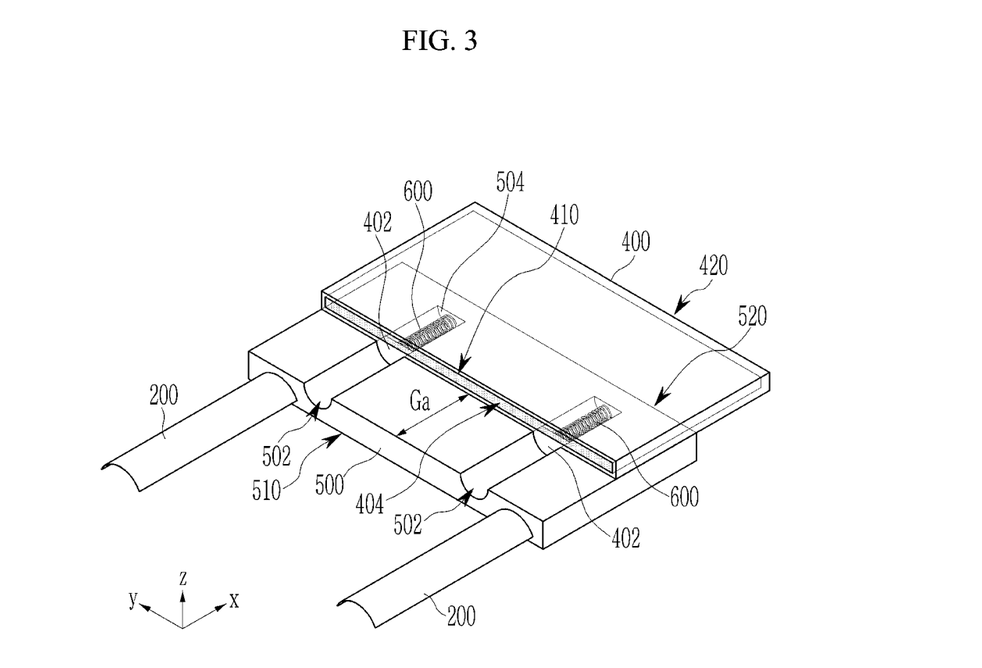
FIG. 3 shows a perspective view of an embodiment of a display device before a display panel of a display device is connected to an upper case.
Figure 4:
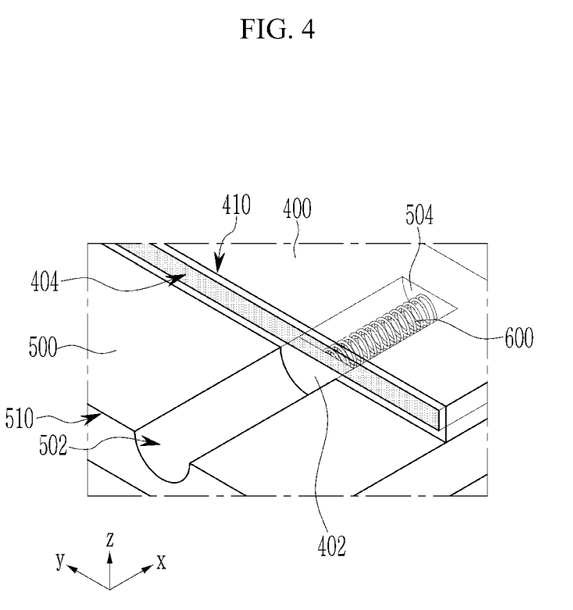
FIG. 4 shows an embodiment of an elasticity member connected to an upper case and a lower case of a display device.
Figure 5:
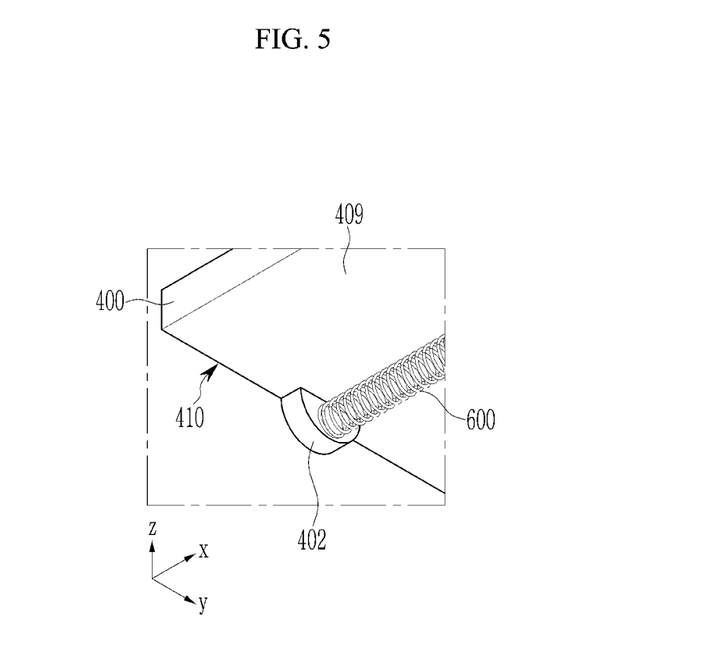
FIG. 5 shows a perspective view of an embodiment of a lower portion of an upper case of a display device.
Figure 6:
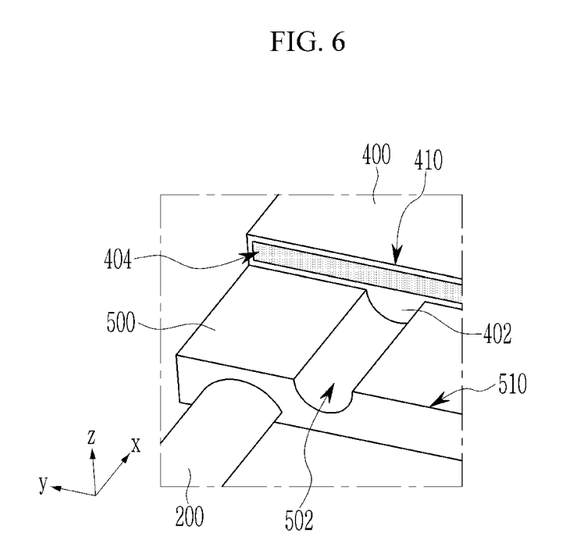
FIG. 6 shows a perspective view of an embodiment of an upper portion of a lower case of a display device.

FIG. 3 shows a perspective view of an embodiment of a display device before a display panel of a display device is connected to an upper case, FIG. 4 shows an embodiment of an elasticity member connected to an upper case and a lower case of a display device, FIG. 5 shows a perspective view of an embodiment of a lower portion of an upper case of a display device, and FIG. 6 shows a perspective view of an embodiment of an upper portion of a lower case of a display device.

Referring to FIG. 3, the display device may further include at least one elasticity member 600 connected between the upper case 400 and the lower case 500.

In an embodiment, the elasticity member 600 may be an extension spring, for example.

FIG. 3 illustrates that the display device includes two elasticity members 600 in the y direction, but a number of the elasticity members 600 is not limited thereto. The respective elasticity members 600 may extend in the x direction in which the display panel 100 is wound and unwound.

The elasticity member 600 may include a portion disposed between a lower side of the upper case 400 and an upper side of the lower case 500.

Referring to FIG. 3, while the display panel 100 and the supporter 200 are not connected to the upper case 400 and the lower case 500, the elasticity member 600 may not be stretched or shrunk, that is, may be in a natural state. A distance (Ga) between the edge 410 of the upper case 400 and the corresponding edge 510 of the lower case 500 in the x direction is less than an x-direction width of the lower case 500.

Referring to FIG. 4 and FIG. 5, the upper case 400 may further include at least one protrusion 402 protruding in the downward z direction from the lower side 409 of the edge 410 to which the display panel 100 is connected.

A first end of the elasticity member 600 may be connected to a lateral side of the protrusion 402 and may be fixed thereto.

A number of the protrusions 402 included by the upper case 400 may be equal to a number of the elasticity members 600.

Referring to FIG. 3, FIG. 4, and FIG. 6, at least one groove 502 arranged with the protrusion 402 in the x direction may be defined in the lower case 500. FIG. 3 illustrates an embodiment in which two grooves 502 spaced apart from each other in the y direction are defined in the display device. The respective grooves 502 extend in the x direction in which the display panel 100 is wound and unwound.

The respective grooves 502 reaches the edge 510 of the lower case 500 but does not extend up to the opposite edge 520 of the lower case 500 and includes an end portion 504 spaced apart from the edge 520.

A second end of the elasticity member 600 may be connected to a lateral side of the end portion 504 of the groove 502 of the lower case 500 and may be fixed thereto.

A number of the grooves 502 included by the lower case 500 may be equal to the number of the elasticity members 600.

A corresponding elasticity member 600 is disposed in the groove 502, and the respective grooves 502 provide a space in which the corresponding elasticity member 600 may extend.

FIG. 3 illustrates, differing from what are shown with reference to FIG. 1 and FIG. 2, that the supporter 200 has a reversed U shape that is upwardly convex.

A space may be defined in at least one of the upper case 400 and the lower case 500 in an embodiment. FIG. 3, FIG. 4, and FIG. 6 illustrate that an internal space 404 is defined in the upper case 400. A battery, a circuit board, etc., may be disposed in the internal space 404. By this, use of the upper case 400 or the lower case 500 may increase.

A space may be provided in the roller 300. A battery, a driver, etc., may be disposed in the internal space of the roller 300.

An operation for the display device in an embodiment to be wound and unwound will now be described with reference to FIG. 7 to FIG. 10 together with the above-described drawings.

Figure 7:
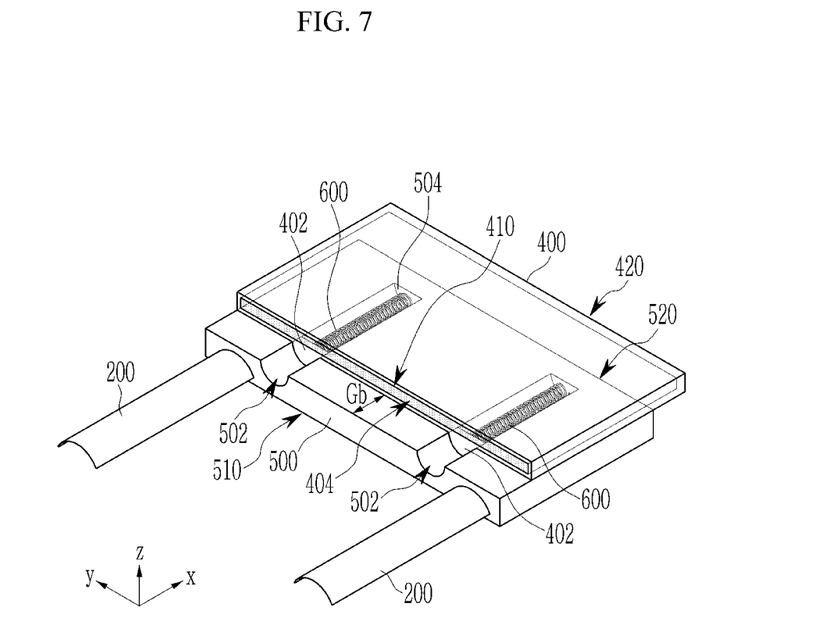
FIG. 7 shows a perspective view of an embodiment of a display device when a display panel and a supporter of a display device are unwound.
Figure 8:
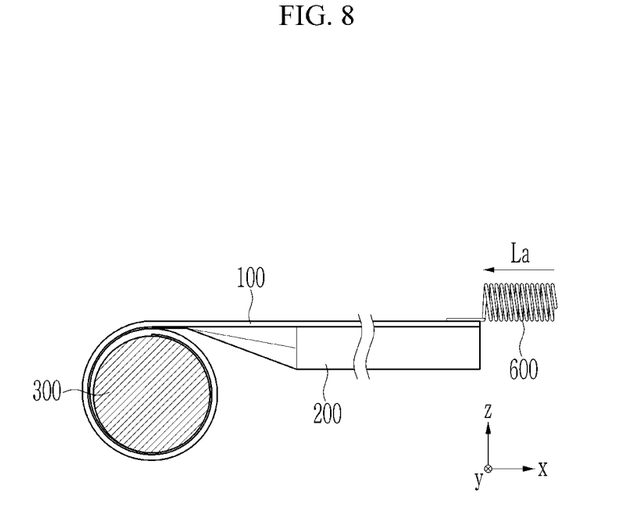
FIG. 8 shows an internal lateral view of an embodiment of a display device when a display panel and a supporter of a display device are unwound.
Figure 9:
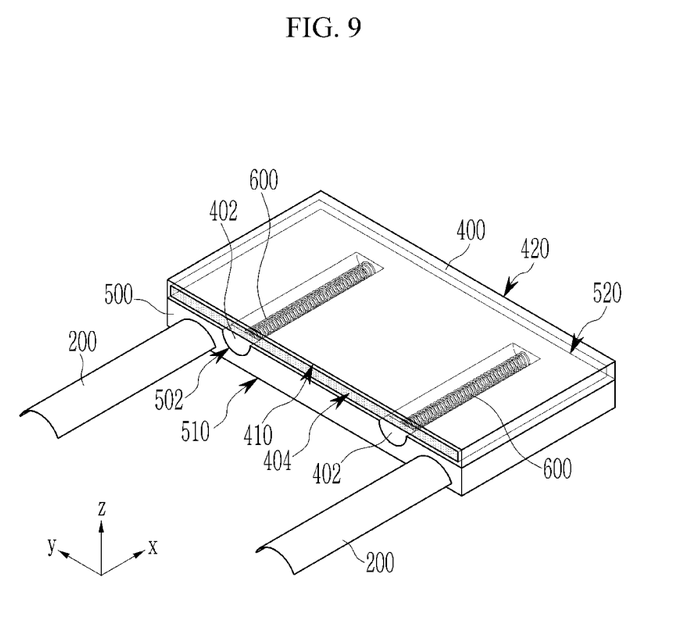
FIG. 9 shows a perspective view of an embodiment of a display device when a display panel and a supporter of a display device are wound.
Figure 10:
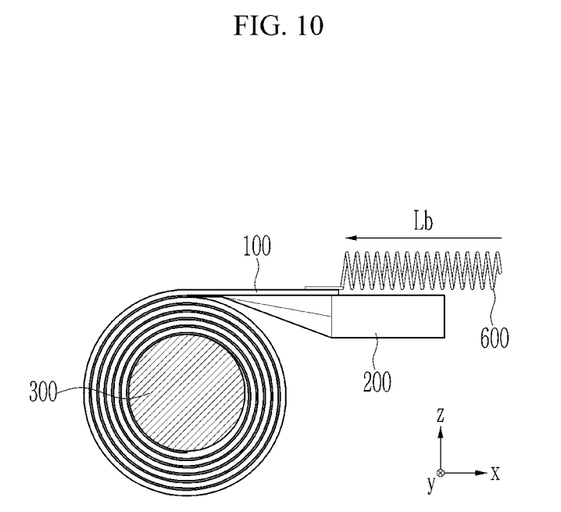
FIG. 10 shows an internal lateral view of an embodiment of a display device when a display panel and a supporter of a display device are wound.

FIG. 7 shows a perspective view of an embodiment of a display device when a display panel and a supporter of a display device are unwound, FIG. 8 shows an internal lateral view of an embodiment of a display device when a display panel and a supporter of a display device are unwound, FIG. 9 shows a perspective view of an embodiment of a display device when a display panel and a supporter of a display device are wound, and FIG. 10 shows an internal lateral view of an embodiment of a display device when a display panel and a supporter of a display device are wound. In FIG. 8 and FIG. 10, the upper case 400 and the lower case 500 are omitted for convenience, and relative positions of the display panel 100, the support part 200, and the elastic member 600 are shown.

Referring to FIG. 7 and FIG. 8, the second end of the display panel 100 is connected to the edge 410 of the upper case 400, and the second end of the supporter 200 is connected to the edge 510 of the lower case 500 and is completely unwound to the outside from the roller 300. The elasticity member 600 is further extended in the x direction than the natural state shown in FIG. 3. Therefore, a tension may be applied to the unwound display panel 100 to maintain a tense state, and the display panel 100 may have flat and improved surface quality without defects such as buckling when it is unwound.

As the elasticity member 600 is further extended than the natural state, a distance (Gb) between the edge 410 of the upper case 400 and the edge 510 of the lower case 500 in the x direction may be less than the distance (Ga) between the edge 410 of the upper case 400 and the edge 510 of the lower case 500 in the x direction shown in FIG. 3.

The elasticity member 600 may have a first length La in the x direction as shown in FIG. 8, and the first length La may be greater than a length of the elasticity member 600 in the x direction in the natural state shown in FIG. 3.

Referring to FIG. 9 and FIG. 10, while the second end of the display panel 100 is connected to the edge 410 of the upper case 400, and the second end of the supporter 200 is connected to the edge 510 of the lower case 500, the display panel 100 and the supporter 200 are completely rolled up and wound on the roller 300. The elasticity member 600 is further extended in the x direction than the same is unwound as shown in FIG. 7 and FIG. 8. Therefore, a greater tension in the x direction may be applied to the display panel 100 when it is wound than when it is unwound.

The elasticity member 600 in the wound state further extends than the elasticity member 600 extends in the unwinding state, and the elasticity member 600 then applies a tension to the display panel 100, so when the wound state shown in FIG. 9 and FIG. 10 is changed to the unwinding state shown in FIG. 7 and FIG. 8, the display device 1000 may be easily unwound by an elastic restoring force of the elasticity member 600 in the x direction.

The elasticity member 600 may have a second length Lb in the x direction as shown in FIG. 10, and the second length Lb is greater than the first length La of the elasticity member 600 in the x direction in the unwinding state shown in FIG. 8.

When the unwound state shown in FIG. 7 and FIG. 8 is changed to the wound state shown in FIG. 9 and FIG. 10 and vice versa, the upper case 400 may slide and move in the x direction with respect to the lower case 500. The elasticity member 600 may further extend and may pull the display panel 100 with a greater tension as the distance between the edge 410 of the upper case 400 and the corresponding edge 510 of the lower case 500 in the x direction is reduced.

In the wound state shown in FIG. 9 and FIG. 10, the edge 410 of the upper case 400 and the edge 510 of the lower case 500 may be arranged in the z direction, and the distance between the edges 410 and 510 in the x direction may be 0 or may be close to 0. The opposite edge 420 of the upper case 400 and the opposite edge 520 of the lower case 500 may be arranged in the z direction, and the upper case 400 and the lower case 500 may substantially overlap each other.

A display device in an embodiment will now be described with reference to FIG. 11 to FIG. 13 together with the above-referenced drawings.

Figure 11:
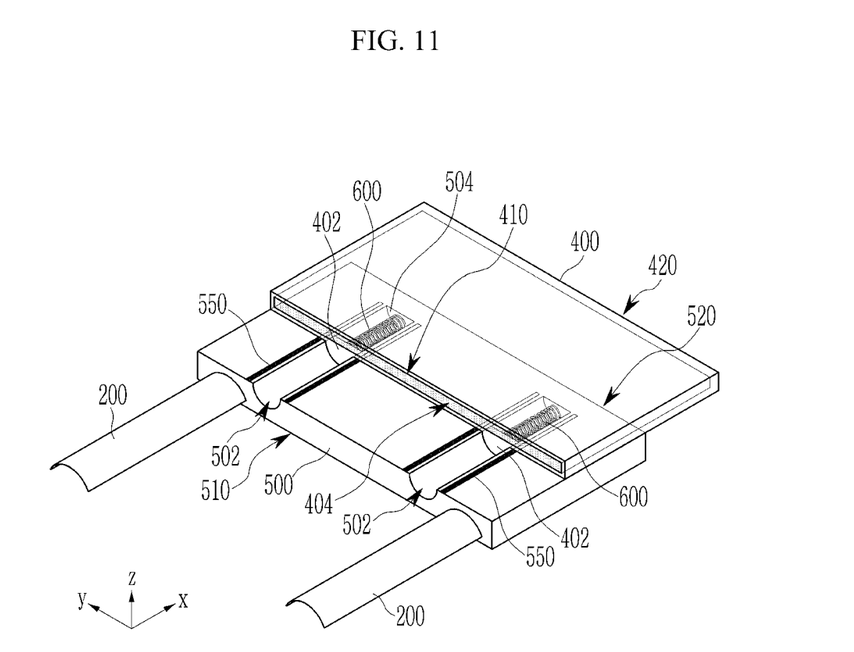
FIG. 11 to FIG. 13 respectively shows a perspective view of an embodiment of a display device.

FIG. 11 shows a perspective view of an embodiment of a display device.

Referring to FIG. 11, the display device mostly corresponds to the above-described display device in an embodiment, and may further include at least one guide rail 550 disposed on the upper side of the lower case 500. FIG. 11 exemplifies that one display device includes four guide rails 550 spaced apart from each other in they direction.

The respective guide rails 550 extend in the direction in which the display panel 100 is wound and unwound, that is, the x direction in which the upper case 400 slides with respect to the lower case 500.

FIG. 11 illustrates that one pair of guide rails 550 are disposed on respective adjacent sides of the respective grooves 502 of the lower case 500, but the position of the guide rail 550 is not limited thereto.

The guide rail 550 may guide the sliding direction so that the upper case 400 may easily slide in the x direction with respect to the lower case 500. Although not shown, a combined structure corresponding to the guide rail of the lower case 500 may be disposed on the lower side of the upper case 400.

Figure 12:
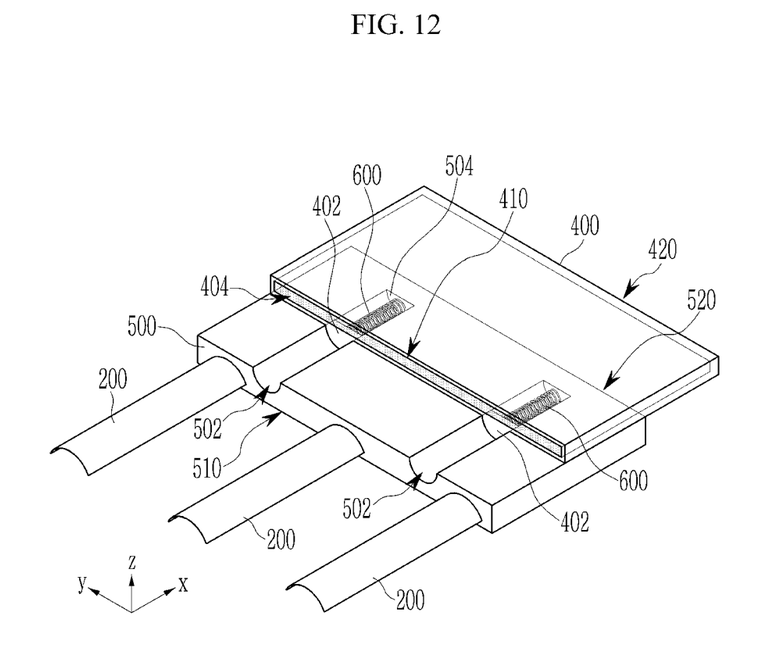

FIG. 12 shows a perspective view of an embodiment of a display device.

Referring to FIG. 12, the display device in an embodiment mostly corresponds to the above-described display device in an embodiment, and includes at least three supporters 200 spaced apart from each other in the y direction. In a like way, although not shown, the display device in an embodiment may include at least three elasticity members 600.

Figure 13:
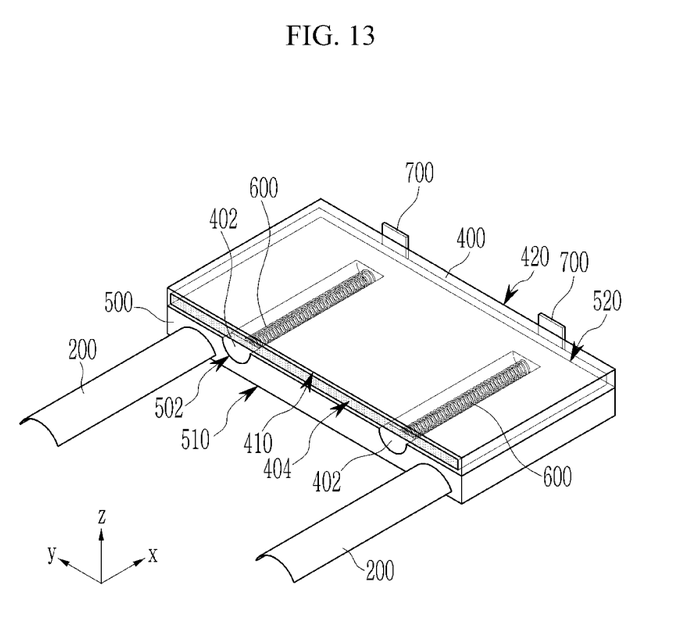

FIG. 13 shows a perspective view of an embodiment of a display device.

Referring to FIG. 13, the display device in an embodiment mostly corresponds to the above-described display device in an embodiment, and it may further include at least one fixing member 700 for fixing the lower case 500 and the upper case 400 while they are closed when the display panel 100 and the supporter 200 are completely wound on the roller 300. FIG. 13 shows that a display device in an embodiment includes two fixing members 700.

The fixing member 700 may be disposed on an outer edge 520 of the lower case 500, and may fix the position of the upper case 400 with respect to the lower case 500 when the display panel 100 and the supporter 200 are wound.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
    a display panel including a first surface which displays images and a second surface opposite to the first surface;
    a supporter disposed on the second surface of the display panel;
    a roller to which a first end of the display panel and a first end of the supporter are connected and on which the display panel and the supporter are wound;
    a first case to which a second end of the display panel opposite to the first end of the display panel is connected;
    a second case which is disposed on the first case and to which a second end of the supporter opposite to the first end of the supporter is connected; and
    an elasticity member disposed between the first case and the second case, and extends in a first direction towards the roller,
    wherein the second case and the first case at least partly overlap each other and the first case slides in the first direction with respect to the second case.

2. The display device of claim 1, wherein
the supporter has a form bent upward or downward while the display panel and the supporter are unfolded from the roller in an unwinding state, and
the supporter is unfolded and is wound on the roller while the display panel and the supporter are wound on the roller in a winding state.

3. The display device of claim 1, wherein
the display panel is disposed further outside than the supporter while the display panel and the supporter are wound on the roller.

4. The display device of claim 1, wherein
the elasticity member includes an extension spring, and
while the display panel and the supporter are unfolded from the roller in an unwinding state and are wound on the roller in a winding state, the extension spring is extended.

5. The display device of claim 4, wherein
a length of the extension spring when the display panel and the supporter are wound is greater than a length of the extension spring when the display panel and the supporter are unwound.

6. The display device of claim 1, wherein
corresponding edges of the first case and the second case are arranged while the display panel and the supporter are completely wound on the roller, and
corresponding edges of the first case and the second case are spaced apart from each other in the first direction while the display panel and the supporter are unfolded from the roller which is an unwinding state.

7. The display device of claim 1, wherein
the first case further includes a protrusion protruding from a side of the first case facing the second case, and
a first end of the elasticity member is connected to a lateral side of the protrusion and is fixed thereto.

8. The display device of claim 7, wherein
the protrusion is disposed near an edge connected to the display panel from among edges of the first case.

9. The display device of claim 7, wherein
a groove is defined in the second case in a position corresponding to the protrusion,
the elasticity member is disposed in the groove, and
the groove extends in the first direction.

10. The display device of claim 9, wherein
the groove includes an end portion spaced apart from an opposite edge to the edge to which the supporter is connected from among edges of the second case, and
a second end of the elasticity member is connected to a lateral side of the end portion of the groove.

11. The display device of claim 1, wherein
at least one of the first case, the second case, and the roller includes a space therein.

12. The display device of claim 11, further comprising
at least one of a battery and a circuit board disposed in the space.

13. The display device of claim 1, further comprising
a guide rail disposed on a side of the second case facing the first case,
wherein the guide rail extends in a direction in which the first case slides with respect to the second case.

14. The display device of claim 1, further comprising
a fixing member for, when the display panel and the supporter are completely wound on the roller, fixing the first case on the second case.

15. A display device comprising:
a display panel including a first surface which displays images and a second surface opposite to the first surface;
a supporter disposed on the second surface of the display panel;
a roller to which a first end of the display panel and a first end of the supporter are connected and on which the display panel and the supporter are wound;
a first case to which a second end of the display panel opposite to the first end of the display panel is connected;
a second case which is disposed on the first case and to which a second end of the supporter opposite to the first end of the supporter is connected; and
an elasticity member including a portion disposed between a first side of the first case facing the second case and a first side of the second case facing the first case,
wherein the second case and the first case at least partly overlap each other and slide in a first direction towards the roller parallel to major surface planes defining the first and second cases.

16. The display device of claim 15, wherein
the elasticity member includes an extension spring, and
the extension spring is extended while the display panel and the supporter are unfolded from the roller which is an unwinding state and are wound on the roller which is a winding state.

17. The display device of claim 16, wherein
a length of the extension spring when the display panel and the supporter are wound is greater than a length of the extension spring when the display panel and the supporter are unwound.

18. A display device comprising:
a display panel including a first surface which displays images and a second surface opposite to the first surface;
a supporter disposed on the second surface of the display panel;
a roller to which a first end of the display panel and a first end of the supporter are connected and on which the display panel and the supporter are wound;
a first case to which a second end of the display panel opposite to the first end of the display panel is connected;
a second case which is disposed on the first case and to which a second end of the supporter opposite to the first end of the supporter is connected; and
an elasticity member connected between the first case and the second case,
wherein a groove is defined in the second case,
the elasticity member is disposed in the groove, and
the groove and the elasticity member extend in a same direction.

* * * * *